United States Patent
Paek

(10) Patent No.: US 9,743,376 B2
(45) Date of Patent: Aug. 22, 2017

(54) APPARATUSES, METHODS, AND RECORDING MEDIUMS FOR PROVIDING LOCATION SHARING SERVICES

(71) Applicant: LINE Corporation, Tokyo (JP)

(72) Inventor: In Geol Paek, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 0 days.

(21) Appl. No.: 14/824,340

(22) Filed: Aug. 12, 2015

(65) Prior Publication Data

US 2016/0192315 A1    Jun. 30, 2016

(30) Foreign Application Priority Data

Dec. 31, 2014    (KR) .................. 10-2014-0195342

(51) Int. Cl.
*H04W 64/00* (2009.01)
*H04W 4/02* (2009.01)

(52) U.S. Cl.
CPC ............. *H04W 64/00* (2013.01); *H04W 4/02* (2013.01)

(58) Field of Classification Search
CPC .................................................... H04W 64/00
USPC .......................................... 455/456.1–456.5
See application file for complete search history.

(56) References Cited

U.S. PATENT DOCUMENTS 8,761,797 B1 * 6/2014 Norton .................. H04W 4/023
455/456.1

2010/0325194 A1 * 12/2010 Williamson ............ H04W 4/02
709/203
2012/0008526 A1 * 1/2012 Borghei ................ H04W 4/021
370/254

FOREIGN PATENT DOCUMENTS

| KR | 1020060097899 | 9/2006 |
| KR | 1020100085749 | 7/2010 |
| KR | 1020140055922 | 5/2014 |
| KR | 1020140146296 | 12/2014 |

OTHER PUBLICATIONS

Naver Blog, www.itsit.kr, Jan. 23, 2014.
Office Action for corresponding Korean Application No. 10-2014-0195342 dated Dec. 1, 2015.

* cited by examiner

*Primary Examiner* — Michael T Vu
(74) *Attorney, Agent, or Firm* — Harness, Dickey & Pierce, P.L.C.

(57) ABSTRACT

A location sharing service apparatus including a memory having computer-readable instructions stored therein; and at least one processor configured to execute the computer-readable instructions to receive a location sharing request and a location setting request, the location sharing request indicating one more friend terminals, detect a current location of a user terminal in response to the location sharing request, periodically receive a second location of the one or more friend terminals, in response to the location sharing request, designate the current location or a set location included in the location setting request as a first location of the user terminal, generate map data including the first location and the second location of the one or more friend terminals, and display the map data.

18 Claims, 12 Drawing Sheets

APPARATUSES, METHODS, AND RECORDING MEDIUMS FOR PROVIDING LOCATION SHARING SERVICES

CROSS-REFERENCE TO RELATED APPLICATION

This application claims priority under 35 U.S.C. §119 to Korean Patent Application No. 10-2014-0195342, filed on Dec. 31, 2014, in the Korean Intellectual Property Office, the disclosure of which is incorporated herein in its entirety by reference.

BACKGROUND

1. Field

One or more example embodiments relate to apparatuses, methods, and computer-readable recording mediums for providing a location sharing service, more particularly, an apparatus, method, and computer program for providing a location sharing service in which a user designates one or more friends and current locations thereof are shared therebetween in a real time.

2. Description of the Related Art

The term location-based service refers to various information services related to a location of a portable terminal detected by using a mobile network, a satellite signal, or the like. For a location-based service to be implemented, it may be desirable to integrate a mobile network technology, a location tracking technology, a mobile communication technology, and an information technology. Such a location-based service may detect a location of a person or a vehicle via a base station of mobile communication or GPS and has been widely used not only in the mobile communication service industry, for example, in a service such as a friend-searching service, a dating service, an emergency call, a navigation for vehicles, location-based content and traffic information, but also in other industries such as mobile commerce, traffic, environment, and medical and administrative services.

SUMMARY

One or more example embodiments include a location sharing service for sharing current locations of a plurality of users.

One or more example embodiments include a location sharing service in which a location of each of a plurality of users is set as a specific location designated by each user and then the location set by the each user is shared therebetween.

One or more example embodiments include a location sharing service for sharing a predetermined or, alternatively, desired target location with a plurality of users by a predetermined or, alternatively, desired time.

One or more example embodiments include a location sharing service for sharing a predetermined or, alternatively, desired interest location with a plurality of users.

Additional aspects will be set forth in part in the description which follows and, in part, will be apparent from the description, or may be learned by practice of the presented embodiments.

According to at least one example embodiment of the inventive concepts, a location sharing service apparatus includes a memory having computer-readable instructions stored therein; and at least one processor configured to execute the computer-readable instructions to receive a location sharing request and a location setting request, the location sharing request indicating one more friend terminals, detect a current location of a user terminal in response to the location sharing request, periodically receive a second location of the one or more friend terminals, in response to the location sharing request, designate the current location or a set location included in the location setting request as a first location of the user terminal, generate map data including the first location and the second location of the one or more friend terminals, and display the map data.

The at least one processor may be further configured to calculate a first distance between the first location and the second location, and display the first distance.

The at least one processor may be further configured such that the location sharing request includes a sharing time for which a location is shared, and the at least one processor is configured to receive the second location and detect the current location until the sharing time expires.

The at least one processor may be further configured to output an alarm when a second distance is equal to or greater than a distance threshold value, and determine whether the second distance between the current location and the set location is equal to or greater than the distance threshold value.

The at least one processor may be further configured to receive an input for sharing a target location, generate the map data so that the target location is included in the map data, calculate a third distance between the target location and the first location or the second location, and generate display data including the map data and the third distance.

The at least one processor may be further configured to receive an interest location sharing request indicating an interest location, and generate the map data to include, in the map data, the interest location.

The at least one processor may be further configured to receive a first message, transmit the first message to the one or more friend terminals, receive a second message from the one or more friend terminals, and generate display data including the map data, the first message, and the second message.

According to at least one example embodiment of the inventive concepts, a method of providing a location sharing service may include detecting, by one or more processors, a current location of a user terminal, in response to a location sharing request input; periodically receiving a second location of one or more friend terminals, wherein the second location is included in the location sharing request; designating, by the one or more processors, a set location included in the location setting request as a first location of the user terminal, in response to a location setting request input; generating the second location and map data including the second location by using the controller; and displaying the map data.

The method may further include calculating a first distance between the first location and the second location by using the controller, wherein the map data includes the first distance.

The method may further include ending, by the one or more processors, the detection of the current location of the user terminal and the receiving of the second location of the one or more friend terminals when a time period expires, wherein the location sharing request includes the time period for which a location is shared.

The method may further include calculating, by the one or more processors, a second distance between the current location and the set location by using the controller, wherein the map data includes the second distance.

The method may further include calculating, by the one or more processors, a third distance between the target location included in a target location sharing request and the first location or the second location, in response to a target location sharing request input, wherein the map data includes the third distance.

In response to an interest location sharing request input, the generating the map data may include generating the map data to include an interest location included in the interest location sharing request.

The method may further include transmitting, by the one or more processors, a first message to the one or more friend terminals, and receiving a second message from the one or more friend terminals; and generating, by the one or more processors, display data including the map data, the first message, and the second message by using the controller.

According to at least one example embodiment of the inventive concepts, a tangible computer-readable recording medium stores instructions that, when executed by a processor, cause the processor to, detect a current location of a user terminal, in response to a location sharing request input; periodically receive a second location of one or more friend terminals, wherein the second location is included in the location sharing request; designate a set location included in the location setting request as a first location of the user terminal, in response to a location setting request input; generate the second location and map data including the second location by using the controller; and display the map data.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
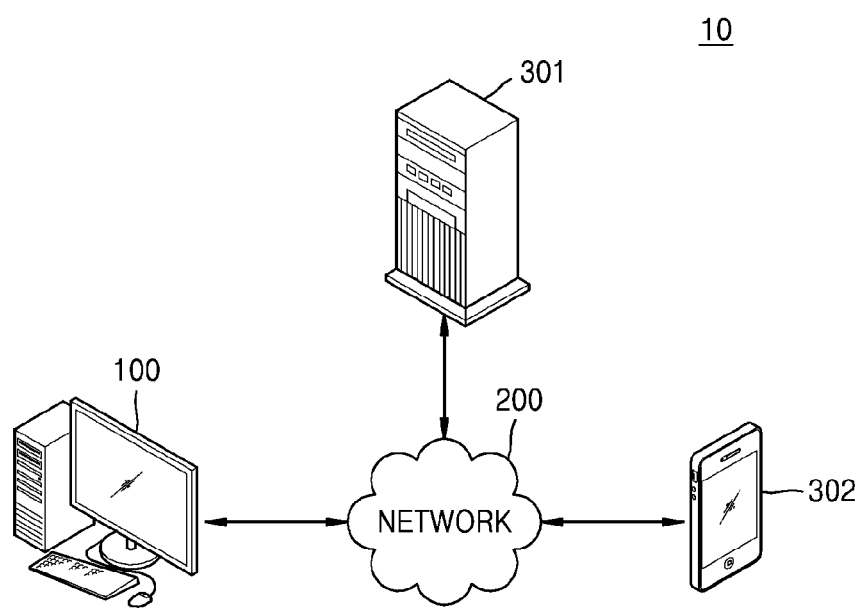
FIG. 1 illustrates a view of a location sharing service apparatus according to at least one embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Example embodiments disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

A group as used herein refers to a user and a plurality of users including one or more friends included in a location sharing request input by the user. According to at least one example embodiment of the inventive concepts, a friend may be defined as a person (e.g., a user) stored in an address list of a location sharing service apparatus. Hereinafter, for the sake of brevity, a case in which a group includes a user and a friend is mainly described, but the number of users and friends is not limited thereto. A location as used herein includes information corresponding to a specific place on a map, and may also include information describing a latitude, a longitude and an altitude of a specific place and, additionally or alternatively, address information.

A friend terminal as used herein refers to a user terminal, i.e., a terminal of a person stored in an address list of a location sharing service apparatus. For the sake of brevity, the friend terminal is called a "friend terminal". However, according to at least some example embodiments of the inventive concepts, there is no technical difference between the friend terminal and the user terminal. The friend terminal may be referred to herein, at times, as a friend. FIG. 1 illustrates a view of a location sharing service apparatus according to at least one example embodiment of the inventive concepts.

Referring to FIG. 1, a location sharing service system 10 according to at least one example embodiment may include a location sharing service apparatus 100, user terminals 301 and 302, and a network 200. According to at least one example embodiment of the inventive concepts, each of a location sharing apparatus (e.g., a location sharing apparatus 100), and user terminal (e.g., user terminals 301 and 302) may include memory and one or more processors. Further, according to at least one example embodiment, operations and/or functions described herein as being performed by any of a location sharing apparatus or a user terminal may be performed by a processor executing program code. The program code may be stored in the memory of the location sharing apparatus and/or user terminal, and may include computer-executable instructions corresponding to the operations and/or functions described herein as being performed by a location sharing apparatus or user terminal.

The location sharing service apparatus 100 may provide a function of sharing locations of a plurality of users therebetween. Here, the location of each user that is shared with each other user may be a current location of a user terminal, or a predetermined or, alternatively, desired set location set by a user. The location sharing service apparatus 100 may receive a location sharing request from a user, in which the user requests the location sharing service apparatus 100 to share a location of the user with others, and then receive information corresponding to a location from one or more friend terminals included in the location sharing request. The location sharing service apparatus 100 may provide the location received from each of user and friend terminals via a location sharing window, and thus the locations of each of the user and friend terminals may be shared. As a result, a user may share a location of the user among a plurality of other user terminals through the location sharing request without transmitting an individual message including location information to each of the plurality of user terminals, respectively. Thus, according to at least one example embodiment, a technical advantage is provided in the form of reduced processing time, power consumption and wireless bandwidth consumption because a single user terminal is capable of transmitting location information to a plurality of friend terminals without sending a separate message to each of the plurality of friend terminals. Accordingly, a single user terminal may generate and send fewer location information messages, thus reducing the processing burden on the user terminal. Further, the resources of the network 200, which transports the location messages sent and received by user ad friend terminals, may be less burdened. As one of ordinary skill would recognize, this reduction in network load may be multiplied when the combined effect of several user terminals sending substantially fewer location information messages is considered.

In at least some example embodiments, the location sharing service apparatus 100 may share a set location determined by a user as well as a current location of the user. Here, the set location refers to a location determined by the user via a user terminal and may be determined by tapping a display unit that displays a specific location on a map or by inputting a specific address via the user terminal. When a current location detected by a location sensing unit of a user terminal is different from a real location to some degrees, the location sharing service apparatus 100 may set the real location of the user as a set location so as to share the real location of the user. When a user does not want to share a current location of the user, the location sharing service apparatus 100 may display a set location of the user so as to share the set location rather than the current location with a plurality of friend terminals. For example, when a user actually lives at 'Tower Palace in dogok-dong' but a location found via a user terminal is not 'Tower Palace in dogok-dong', 'Tower Palace in dogok-dong' may be set as a location of the user. Alternatively, when a user does not want to share a location of the user, the user may share a set location of the user to protect the privacy of the user. For example, when a user travels abroad and does not want to let others know that the user is travelling, the user may set an address (e.g., a home address of the user) as a current location of the user.

Also, when a user moves around a specific place, the location sharing service apparatus 100 may set a current location of the user as a set location of the user. For example, when a user moves around Gangnam station, the user may set 'Gangnam station' as a location of the user so that the location of the user may not continuously change.

In at least some example embodiments, the location sharing service apparatus 100, in response to a received location sharing request, may transmit, to one or more friend terminals, an agreement request requesting an agreement on the location sharing request, and receive only a location of the friend terminal that agrees on the location sharing request. As described herein, when a friend does not want to share their location, the friend may not agree on a location sharing request, and thus, the location of the friend may not be shared. Also, the location sharing service apparatus 100 may provide locations of other user terminals of a group to a first user terminal that agrees on a location sharing request, but may not provide them to second user terminal that does not agree on the location sharing request. Accordingly, the location sharing service apparatus 100 does not unconditionally share location information, that is, personal information of a user terminal, in response to a location sharing request.

In at least some example embodiments, the location sharing service apparatus 100 may receive an interest location sharing request for sharing a target location sharing request from a user terminal included in a group and, in response to the interest location sharing request, may share the predetermined or, alternatively, desired interest location with every user terminal included in the group. In this case, the interest location sharing request may include at least one information selected from an address, a location and a sign, which correspond to the predetermined or, alternatively, desired interest location. As a result, an individual user terminal, from among a group of user terminals, may share an interest location with the rest of the group without individually and separately transmitting a message including the interest location to each one of the plurality of user terminals included in the group. The location sharing service apparatus 100 may transmit an interest location sharing request to every user terminal to thus share the predetermined or, alternatively, desired interest location with the plurality of user terminals included in the group. A predetermined or, alternatively, desired interest location may be shared with every user terminal included in a group. A user may determine a predetermined or, alternatively, desired interest location by tapping a specific location on a map, or by inputting an address of the predetermined or, alternatively, desired interest location. A predetermined or, alternatively, desired interest location may be provided with a mark for a place on map data and a map.

In at least some example embodiments, the location sharing service apparatus 100 may receive a target location sharing request for sharing a predetermined or, alternatively, desired target location from a user terminal included in a group, and, in response to the target location sharing request, may share the predetermined or, alternatively, desired target location with every user terminal included in the group. In this case, the target location sharing request is a request to share the predetermined or, alternatively, desired target location with every user included in the group and may include, for example, a selected place of interest (e.g., a planned meeting place) for all or some users in the group. Also, the target location sharing request may include not only a place where a user has to reach but also time information by when the user has to reach the place. For example, When all or some users in a chat room may have an appointment to meet at a coffee shop near Gangnam Station this Saturday, the users in the group may transmit a target location sharing request, in which a coffee shop near Gangnam Station is set as a target location and this Saturday is set as a target time, to the chat room. In response to the target location sharing request, the location sharing service apparatus 100 may share a location of the coffee shop near Gangnam Station until this Saturday. As a result, the user that sent the target location sharing request to the location sharing service apparatus 100 may not need to individually and separately transmit a message including a target location and a target time to a plurality of user terminals included in a group. The location sharing service apparatus 100 may share a target location and a target time with a plurality of users included in a group by using a single target location sharing request via a chat room.

The location sharing service apparatus 100 and the user terminals 301 and 302 may be, for example, communication terminals using a web service in a wired and/or wireless communication environment. Here, each of the location sharing service apparatus 100 and the user terminals 301 and 302 may be a personal computer or a portable terminal of a user. Although a portable terminal is illustrated as a smartphone in FIG. 1, one or more example embodiments of the inventive concepts are not limited thereto and, as described above, any terminal including an application for web browsing may be used.

In detail, the location sharing service apparatus 100 and the user terminals 301 and 302 may include a computer (for example, a desktop, laptop, or tablet), a media computing platform (for example, cable, satellite set-top box, digital video recorder), a hand-held computing device (for example, a personal digital assistant (PDA), an email client), any type of cellphone, or any other type of computing or communication platform, but at least some example embodiments of the inventive concepts are not limited thereto.

The network 200 may connect the user terminals 301 and 302 and the location sharing service apparatus 100 to each other. In other words, the network 200 refers to a network that provides an access path for the user terminals 301 and 302 to access a the location sharing service apparatus 100 and then transmit and receive data to and from the location sharing service apparatus 100. The network 200 may include, but is not limited to, a wired network such as local area networks (LANs), wide area networks (WANs), metropolitan area networks (MANs), and integrated service digital networks (ISDNs) or a wireless network including, for example, wireless LANs, CDMA, Bluetooth, and satellite communication.

Figure 2:
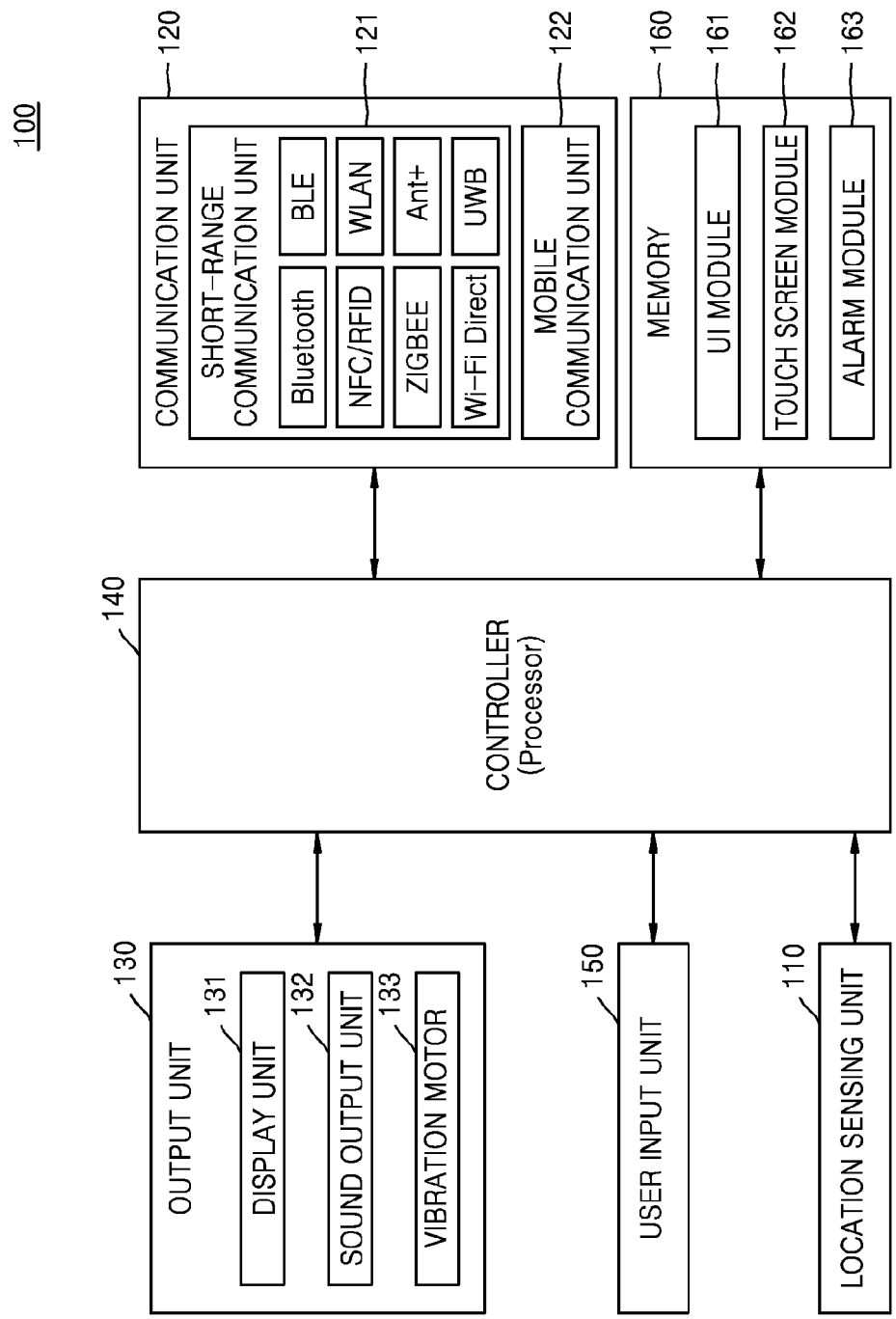
FIG. 2 is a block diagram showing a location sharing service apparatus according to at least one example embodiment of the inventive concepts.

FIG. 2 is a block diagram of the location sharing service apparatus 100 according to an embodiment.

Referring to FIG. 2, the location sharing service apparatus 100 according to an embodiment may include a user input unit 150 (e.g., an alphanumeric keyboard, touch screen, motion sensors, camera, etc.), a location sensing unit 110 (which may be implemented, for example, by circuitry and/or program code executed by a processor) a communication unit 120 (which may be implemented, for example, by circuitry and/or program code executed by a processor), a controller 140 (which may be or include one or more processors), an output unit 130 (which may be implemented, for example, by circuitry and/or program code executed by a processor), a display unit 131 (e.g., a display screen), a sound output unit 132 (e.g., speakers, headphone jack, etc.), a vibration motor 133, and a memory 160. According to at least one example embodiment of the inventive concepts, the communication unit 120, the output unit 130, and the user input unit 150 may be controlled and/or implemented by the controller 140. For example, the memory 160 may include program code including instructions corresponding to any or all of the operations and/or functions described herein as being performed by any or all of the communication unit 120, the output unit 130, and the user input unit 150, and the controller 140 may execute the program code.

The user input unit 150 may receive from a user a location sharing request for sharing a location of the user with one or more friend terminals. The user input unit 150 may receive from a user a location setting request for setting a location of the user by using a set location. Here, the location sharing request includes one or more friends sharing a time and a location thereof. The location setting request includes information on an address, a sign and a location, corresponding to a predetermined or, alternatively, desired set location, and set the predetermined or, alternatively, desired set location as a first location of a user terminal. In response to the location setting request, the controller 140 sets the set location as a first location that refers a location of a user terminal.

In at least some example embodiments, the user input unit 150 may receive a location setting cancellation request for cancelling a first location set by a location setting request. In response to the location setting cancellation request from a user terminal, the controller 140 may reset the first location set as a set location to be a current location of a user terminal.

In at least some example embodiments, the user input unit 150 may receive from a user an interest location sharing request for sharing a predetermined or, alternatively, desired interest location with one or more friend terminals included in a group. Here, the interest location sharing request may include at least one of information on an address, a sign, a building, and a location, corresponding to the predetermined or, alternatively, desired interest location.

In at least some example embodiments, the user input unit 150 may receive from a user a target location sharing request for sharing a predetermined or, alternatively, desired target location with one or more friend terminals. Here, the target location sharing request may include an appointment place (e.g., a planned meeting place) between a user and all or some friends in a group or the like, as a target location. Also, the target location sharing request may include not only a location to reach but also a time by when the user and the friends are to arrive at the location. For example, when a user makes an appointment with all or some one or more friends in a group, the user may input a target location sharing request in which a coffee shop near Gangnam Station is a target location and this Saturday is a target time.

The controller 140, in response to the location sharing request and the location setting request, may receive a current location of the user terminal or a set location set by the user and then set the current location or the set location as a first location of the user terminal.

The controller 140, in response to the location sharing request, may control the communication unit 120 to receive from a friend terminal a second location of the friend terminal from among the one or more friend terminals. Here, the second location may be received at predetermined or, alternatively, desired time intervals.

The controller 140 may calculate a first distance between the first location of the user terminal and each of the second locations of the one or more friend terminals. The controller 140 may generate display data so as to include the first distance.

The controller 140 may detect a current location of a user terminal until a sharing time included in the location sharing request expires and control the location sharing service apparatus 100 to receive a second location of a friend terminal. Here, the sharing time may be set by a user and examples thereof may be a specific time interval such as an hour, a day, or the like, or an expiry date such as by 24:00, Dec. 31, 2014.

The controller 140 may calculate a second distance between the current location and the set location, of the user, and then determine whether the second distance is equal to or greater than a predetermined or, alternatively, desired distance threshold value. When the second distance is equal to or greater than the predetermined or, alternatively, desired distance threshold value, the controller 140 may control the location sharing service apparatus 100 to output an alarm via the output unit 130.

The controller 140 may calculate a distance between the target location and the first location and/or a distance between the target location and the second location according to the target location sharing request.

Also, the controller 140, in response to the target location sharing request, may generate arrival information on each of a user and one or more friends by comparing a location with a target location of each of a user terminal and one or more friend terminals. In this case, the arrival information may relate to whether the user and one or more friends included in a group have arrived at the target location, and include at least one selected from information whether the user and one or more friends have arrived at the target location, a remaining distance to the target location, and information on an expected arrival time of the user and one or more friends.

In detail, whether the user and friends have arrived at the target location is included in the arrival information and may be determined by taking into account whether a distance between each location of the user and friend terminals and the target is equal to or less than a threshold value, and whether each location of the user and friend terminals is equal to the target location. The remaining distance to the target location of the user and friends, which may be included in the arrival information, may be calculated by using a difference between each location of the user and friend terminals and the target location. The expected arrival time of the user and friends, which may be included in the arrival information, may be calculated by dividing the remaining distance to the target location by a moving speed of the user.

The controller 140, in response to the target location sharing request, may control the location sharing service apparatus 100 to include the target location in map data, and then include the map data and the arrival information in display data.

The controller 140, in response to the interest location sharing request, may control the location sharing service apparatus 100 to include the interest location in map data.

The location sensing unit 110, in response to the location sharing request, may detect a current location of a user terminal. Here, the current location of the user terminal may be detected at predetermined or, alternatively, desired time intervals.

The communication unit 120 may include at least one component that may connect the location sharing service apparatus 100 with at least one of the user terminals 301 and 302, or the location sharing service apparatus 100 with a server for a location sharing service (not shown) for communication with each other. For example, the communication unit 120 may include a short-range communication unit 121, and a mobile communication unit 122. The communication unit 120 may transmit a location of a user terminal to one or more friend terminals, and receive a location of a friend terminal from the friend terminal. In addition, the communication unit 120 may transmit a message of the user terminal to the one or more friend terminals, and receive a message of the friend terminal from the friend terminal.

The short-range communication unit 121 may include, but is not limited to, a Bluetooth communication unit, a Bluetooth low energy (BLE) communication unit, a near field wireless communication unit, a WLAN (Wi-Fi) communication unit, a ZigBee communication unit, an infrared data association (IrDA) communication unit, a Wi-Fi direct (WFD) communication unit, an ultra wideband (UWB) communication unit, an Ant+ communication unit, or the like, each of which may be implemented by circuitry and/or program code executed by a processor.

The mobile communication unit 122 exchanges a wireless signal with at least one of a base station, an external apparatus, and a server in a mobile communication network. Here, the wireless signal may include various types of data depending on a voice call signal, a video call signal, or a text/multimedia message transmission and reception.

The location sharing service apparatus 100 according to an embodiment may further include the output unit 130 for outputting an alarm when a difference between the set location and a current location of a first user terminal is equal to or greater than a predetermined or, alternatively, desired threshold value.

The output unit 130 may include the display unit 131, an audio output unit 132, a vibration motor 133, and the like.

The display unit 131 may display map data generated by the controller 140. The map data may include a first location of a user terminal, a second location of each of one or more friend terminals, a target location, and an interest location. Also, the display unit 131 may further display a distance difference between the first location and the second location, a distance difference between the target location and the first location or the second location, and a distance difference between a set location and the first location. The display unit 131 may display at least one selected from a location sharing status of each of the user terminal and one or more friend terminals included in a group, a location of each of the user terminal and one or more friend terminals, and an address search button. The display unit 131 may display the location of each of the user terminal and one or more friend terminals as a photo or an image set by a user.

When a touch pad and the display unit 131 form a mutual layer structure and then are formed as a touch screen, the display unit 131 may be used as both an output device and input device. Also, depending on a type of the location sharing service apparatus 100, at least two display units 131 may be included. Here, two or more display units 131 may be disposed to face each other by using a hinge.

The audio output unit 132 outputs audio data that is received via the communication unit 120 or is stored in the memory 160. The audio output unit 132 may include a speaker, a buzzer, or the like.

The vibration motor 133 may output a vibration signal. For example, the vibration motor 133 may output the vibration signal corresponding to an output of audio data or image data (for example, a sound effect generated when an operation is performed in a game application or an image changed after an operation is performed in a game application). In addition, the vibration motor 133 may output the vibration signal when a touch is input to a touch screen.

The controller 140 generally controls all operations of the location sharing service apparatus 100. For example, the controller 140 may generally control the location sensing unit 110, the communication unit 120, the output unit 130, the input unit 150, the memory 160, and the like by executing programs stored in the memory 160.

The memory 160 may sequentially store a location, a set location, an interest location, a target location, and the like, of a user, which are shared by the user. The memory 160 may store a shared current location or a shared set location of each user (friend) in a time order.

The memory 160 may include at least one storage medium from among a flash memory-type storage medium, a hard disk-type storage medium, a multimedia card micro-type storage medium, card-type memories (e.g., an SD card, an XD memory, and the like), Random Access Memory (RAM), Static Random Access Memory (SRAM), Read-Only Memory (ROM), Electrically Erasable Programmable Read-Only Memory (EEPROM), Programmable Read-Only Memory (PROM) magnetic memory, a magnetic disc, and an optical disc. Also, the location sharing service apparatus 100 may drive a web storage or a cloud server that performs a storing function of the memory 160 on the Internet.

The programs stored in the memory 160 may include a plurality of modules depending on their functions, and may include, for example, a user interface (UI) module 161, a touch screen module 162, an alarm module 163, and the like.

The UI module 161 may provide a customized UI, graphical UI (GUI), or the like that interfaces with a location sharing service. The touch screen module 162 may detect a user's touch gesture on a touch screen, and transfer information about the touch gesture to the controller 140. The touch screen module 162 according to an embodiment may recognize and analyze a touch code. The touch screen module 162 may be configured as separate hardware including a controller The touch screen module 162 may include various sensors to detect a touch or a proximate touch on a touch sensor. An example of a sensor to detect the touch on the touch screen may include a tactile sensor. The tactile sensor detects a contact of a specific object by at least as much as a person can detect. The tactile sensor may detect various types of information such as roughness of a contact surface, hardness of the contact object, temperature of a contact point, or the like. An example of the sensor to detect the touch on the touch screen may include a proximity sensor. The proximity sensor detects the existence of an object that approaches a predetermined or, alternatively, desired detection surface or that exists nearby, by using a force of an electro-magnetic field or an infrared ray, without using a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture of the user may include a tap gesture, a touch & hold gesture, a double tap gesture, a drag gesture, a panning gesture, a flick gesture, a drag & drop gesture, a swipe, or the like.

The alarm module 163 may generate a signal to inform about an occurrence of an event of the location sharing service apparatus 100. An example of the event that occurs in the location sharing service apparatus 100 may include a key signal input or the like. The alarm module 163 may output an alarm signal as a video signal via the display unit 131, as an audio signal via the sound output unit 132, or as a vibration signal via the vibration motor 133.

In at least some example embodiments, the location sharing service apparatus 100, in response to the location sharing request, may transmit an agreement request requesting an agreement on a location sharing to a friend terminal included in the group, and receive an agreement signal, which agrees on the location sharing, from the friend terminal as a reply of the agreement request.

In at least some example embodiments, the location sharing service apparatus 100 may generate map data including a shared current location, a target location, an interest location, or the like, and display data to include a message input by a user or a message received from one or more friend terminals. The message input by a user may be displayed on a region of display data provided via a user terminal, and an input time and information on the user may also be displayed thereon. The message input by a user may be displayed in a different font type, size, and color depending on the user. The font type, size and color may be designated by a user.

Figure 3:
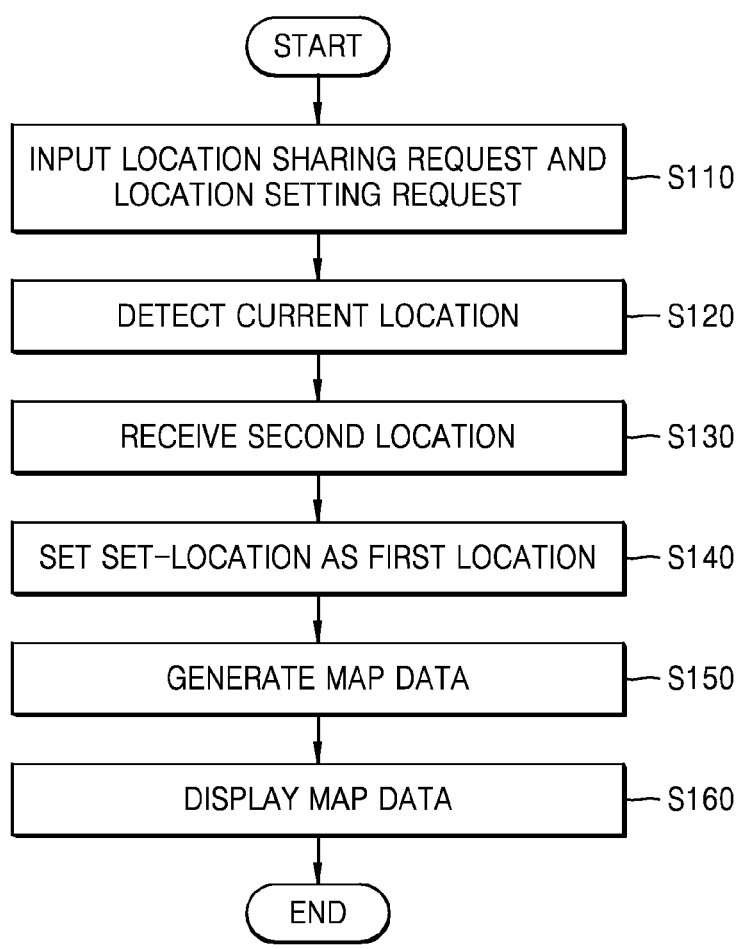
FIGS. 3 to 5 are flowcharts showing methods of providing a location sharing service, according to one or more example embodiments of the inventive concepts.
Figure 4:
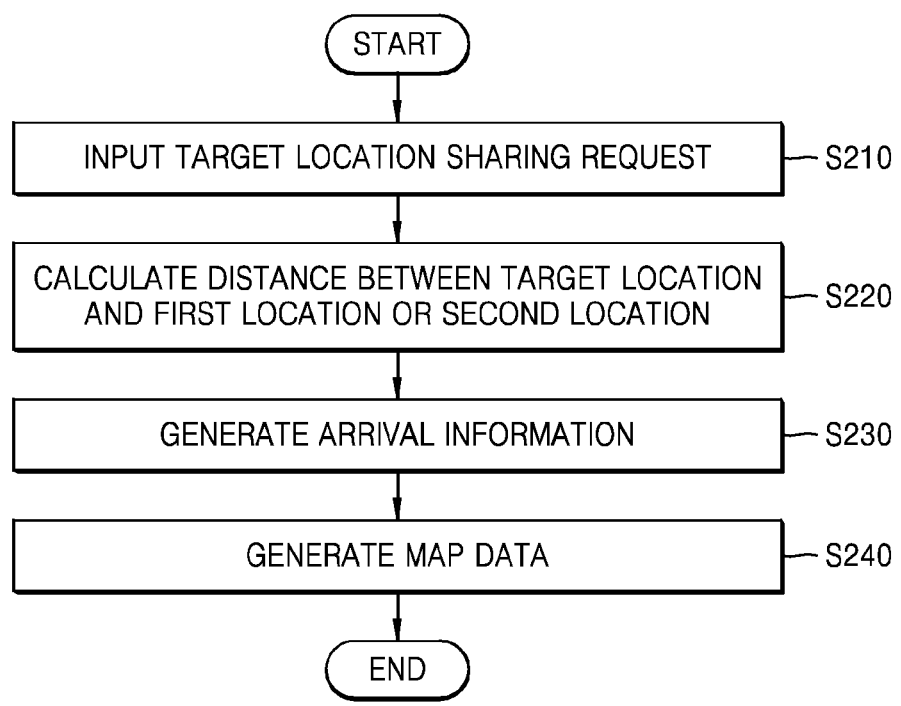
Figure 5:
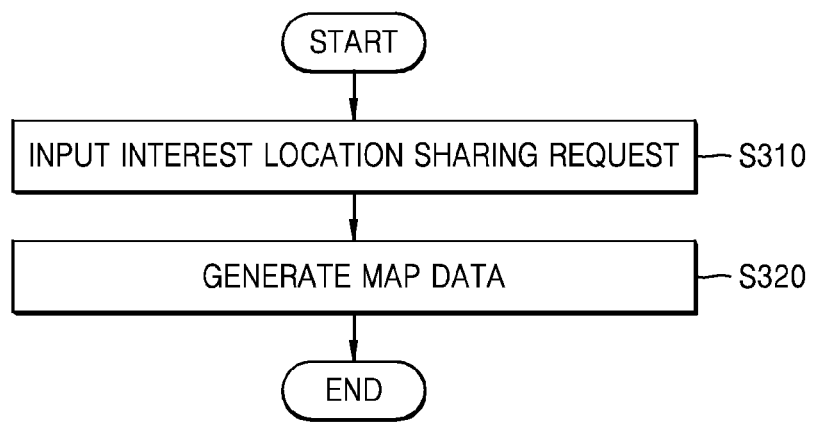

FIGS. 3 to 5 illustrate flowcharts of methods of providing a location sharing service, according to one or more example embodiments of the inventive concepts.

Referring to FIG. 3, a method of providing the location sharing service may include inputting a location sharing request and a location setting request (S110), sensing a current location (S120), receiving a second location (S130), designating a set location as a first location (S140), generating map data (S150), and displaying display data (S160).

In S110, the input unit 150 may receive from a user the location sharing request for sharing a location of the user with one or more friend terminals, and may receive from the user the location setting request for setting the location of the user to be the set location.

In S120, the location sensing unit 110 may detect a current location of a user terminal in response to the location sharing request. The current location of the user terminal may be detected at predetermined or, alternatively, desired time intervals.

In S130, the communication unit 120 may receive the second location of a friend terminal from one or more friend terminals. The second location may be received from each of one or more friend terminals at predetermined or, alternatively, desired time intervals.

In S140, the controller 140 may designate the set location included in the location setting request to be the first location of the user.

In S150, the controller 140 may generate map data including the first location and the second location.

In S160, the display unit 131 may display the map data.

In at least some example embodiments, the location sharing request may include a sharing time. When the sharing time expires, the controller 140 may finish sharing the first location and the second location with the user and one or more friend terminals.

In at least some example embodiments, the method of providing the location sharing service may further include generating an alarm (not shown). The controller 140 may calculate the distance difference between the set location and the current location of the user terminal, and then, when the distance difference is equal to or greater than a predetermined or, alternatively, desired threshold value, may output an alarm.

In at least some example embodiments, the method of providing the location sharing service may calculate a distance difference between the user terminal and each of one or more friend terminals, and generate display data including map data and the distance difference. The display data may be output via the display unit.

Referring to FIG. 4, the method of providing location sharing service, according to another embodiment, may include inputting a target location sharing request (S210), calculating a distance difference between a target location and a first location or a second location (S220), calculating arrival information (S230), and generating map data (S250).

In S210, the input unit 150 may receive from a user a target location sharing request for sharing a predetermined or, alternatively, desired target location with one or more friend terminals. The target location sharing request may include an appointment place where the user and all or some friends in a group meet or the like as a target location. Also, the target location sharing request may include a location to arrive at but also a time by when the user and the friends are to arrive at the location. For example, when a user and all or some one or more friends make an appointment to meet at a coffee shop near Gangnam Station this Saturday, the user may input a target location sharing request in which a coffee shop near Gangnam Station is a target location and this Saturday is a target time.

In S220, the controller 140 may calculate the distance difference between the target location and the first location or the distance difference between the target location and the second location according to the target location sharing request.

In S230, the controller 140, in response to the target location sharing request, may compare positions of the user terminal and one or more friend terminals in the group with the target location, thereby generating arrival information about each of the user and one or more friends. The arrival information is related to whether the user and one or more friends in the group arrive at the target location and may include at least one selected from whether the user and one or more friends arrive at the target location, a remaining distance to the target location, and an expected arrival time of the user and one or more friends. The arrival information is described above, and thus, detailed descriptions thereof will not be repeated.

In S240, the controller 140, in response to the target location sharing request, may control the location sharing service apparatus 100 to include the target location in map data, and to include the map data and the arrival information in display.

Referring to FIG. 5, the method of providing a location sharing service, according to another embodiment, may include inputting an interest location sharing request (S310) and generating map data (S320).

In S310, the input unit 150 may receive from a user an interest location sharing request for sharing a predetermined or, alternatively, desired interest location with one or more friend terminals included in a group. The interest location sharing request may include at least one selected from an address, a sign, a building, and location information, which correspond to the predetermined or, alternatively, desired interest location.

In S320, the controller 140 may control the location sharing service apparatus 100 to include the interest location in map data in response to the interest location sharing request.

FIGS. 6 to 11 each illustrate a screen displaying display data provided to a user terminal by a location sharing service apparatus.

Figure 6:
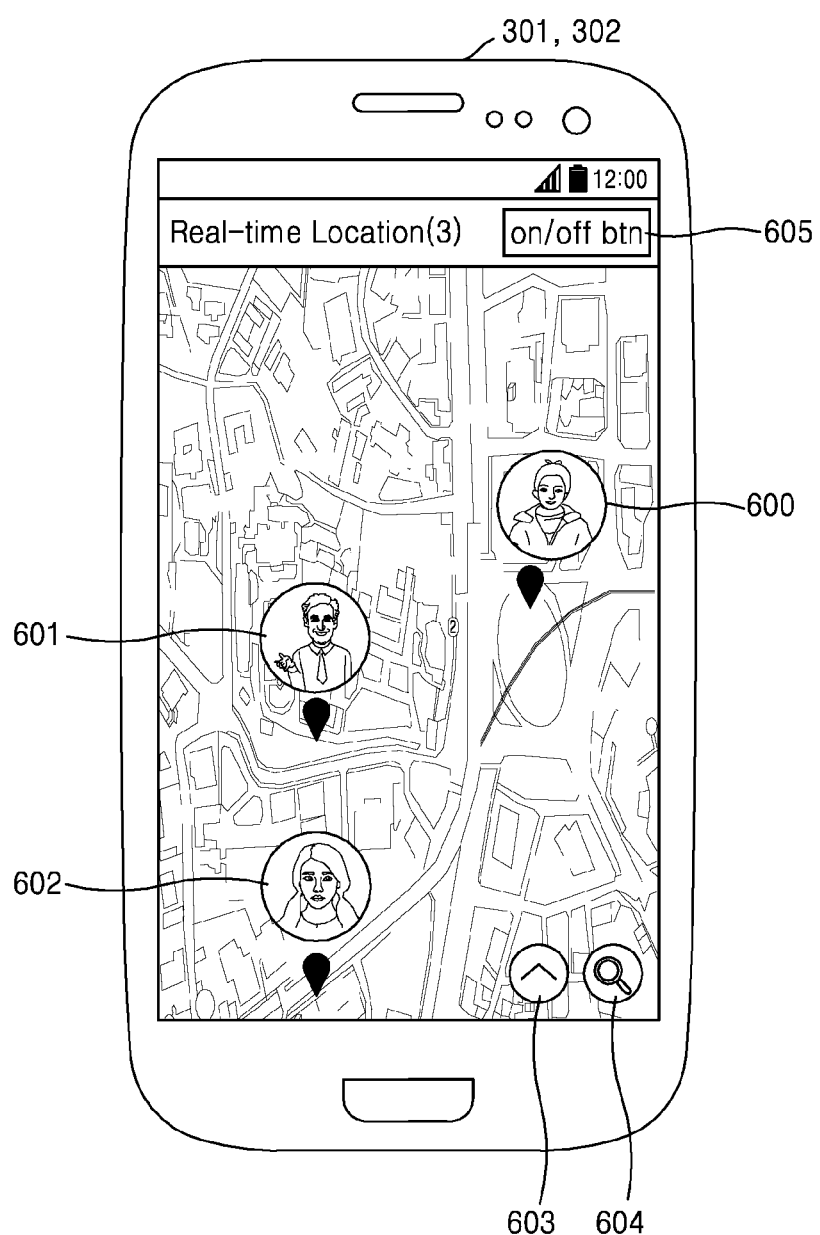
FIGS. 6 to 11 illustrate examples of screens provided by a location sharing service.

Referring to FIG. 6, the location sharing service apparatus 100 according to one or more embodiments may provide display data so that locations of a user, a first friend, and a second friend who are included in a group are displayed on a user terminal. The location sharing service apparatus 100 may display an image of a user 600 at a place corresponding to the location of the user 600, an image of a first friend 601 at a place corresponding to the location of the first friend 601, and an image of the second friend 602 at a place corresponding to the location of the second friend 602.

As illustrated in FIG. 6, map data may include an additional function button 603, an address search button 604, and information on a location sharing status 605. When the additional function button 603 is selected by a user input, a pop-up window including at least one function selected from showing my location, showing a person/a place shared with each other, and showing a location/a place shared with each other may be displayed. When an address search button 604 is selected by a user input, a window, in which an address to search for may be input, may be displayed, and a result of searching for the address input by the user may be provided. The location sharing status 605 may show whether the user shares the location of the user.

Figure 7:
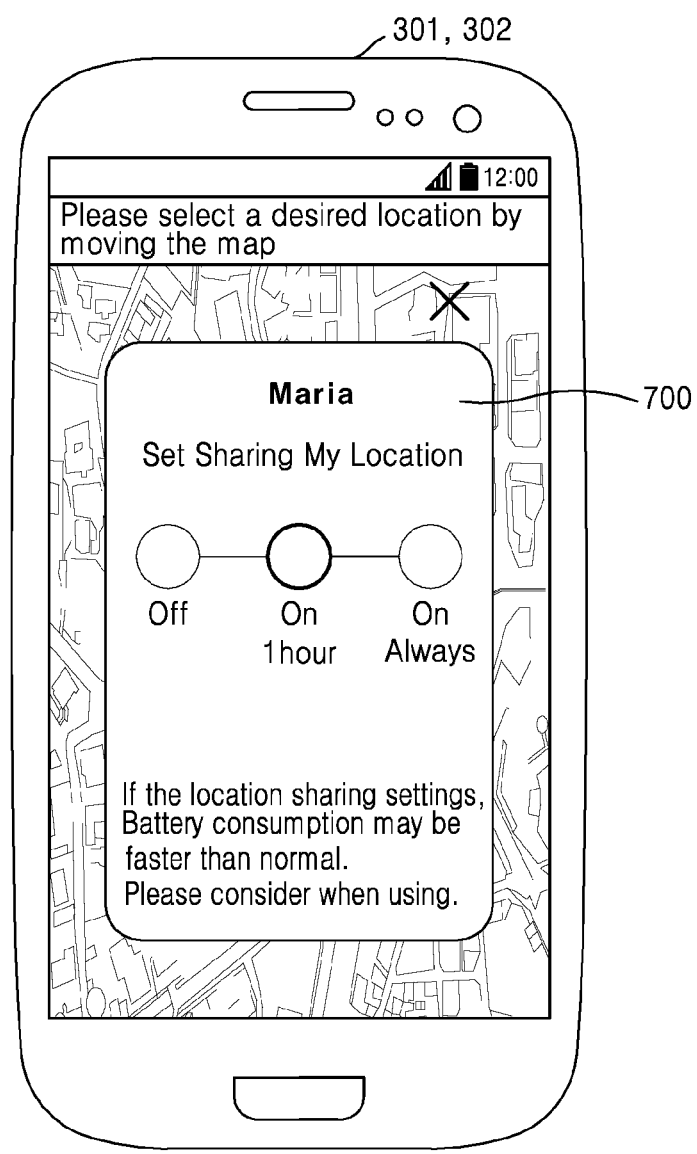

FIG. 7 illustrates a screen for setting a location sharing service provided to a user terminal by using the location sharing service apparatus 100 according to one or more embodiments.

As illustrated in FIG. 7, a sharing setting screen 700 may include an OFF mode for not sharing a location of a user, a mode for sharing the location of the user for an hour and not sharing the location of the user thereafter, and a mode for always sharing the location of the user. The sharing setting screen 700 may further include a mode for sharing a location for a predetermined or, alternatively, desired time determined by a user.

Figure 8:
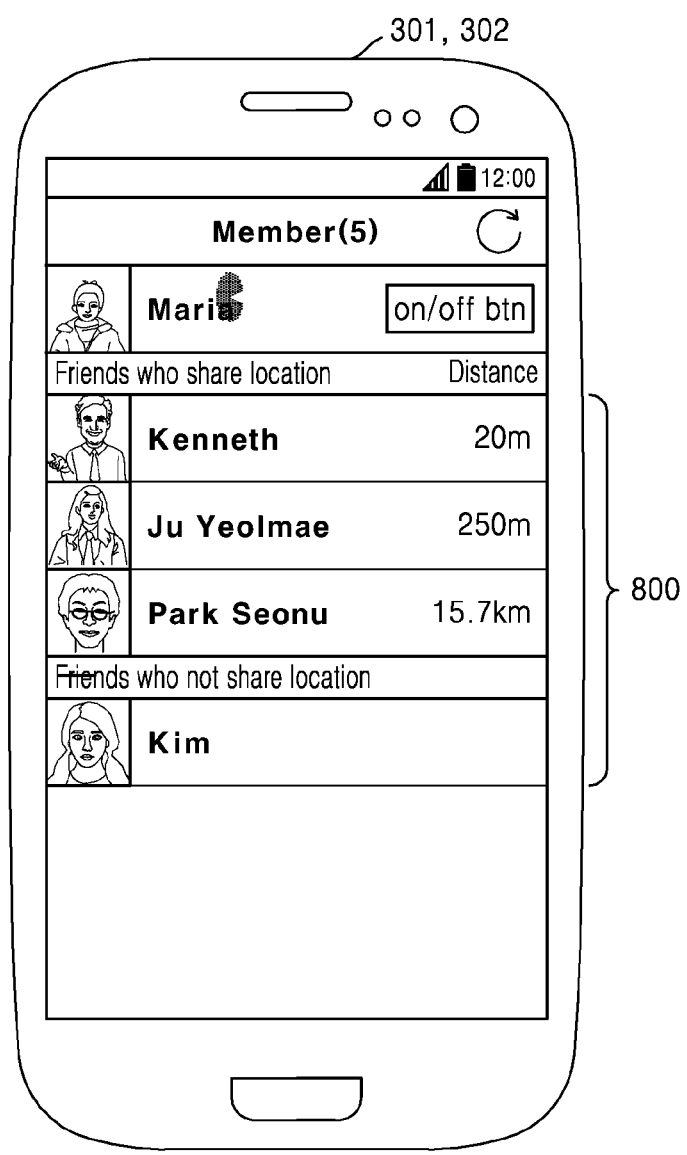

FIG. 8 illustrates a screen displaying a process status provided to a user terminal by using the location sharing service apparatus 100 according to one or more embodiments. As illustrated in FIG. 8, the screen providing the process status may display an ID/a name/profile information of each of a plurality of users included in a chat room and a remaining distance of each of the users to a target location. In addition, as illustrated in FIG. 8, information on a person who shares a location may be separately displayed from information on a person who does not share a location, and the information on the person who does not share a location may not include arrival information such as a remaining distance to a target location.

Figure 9A:
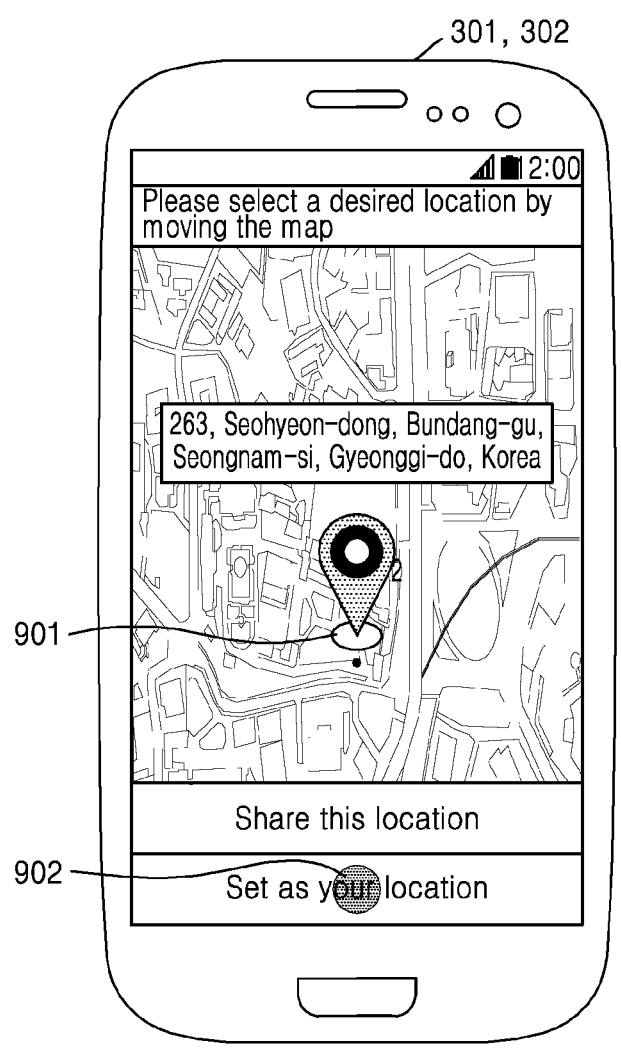
Figure 9B:
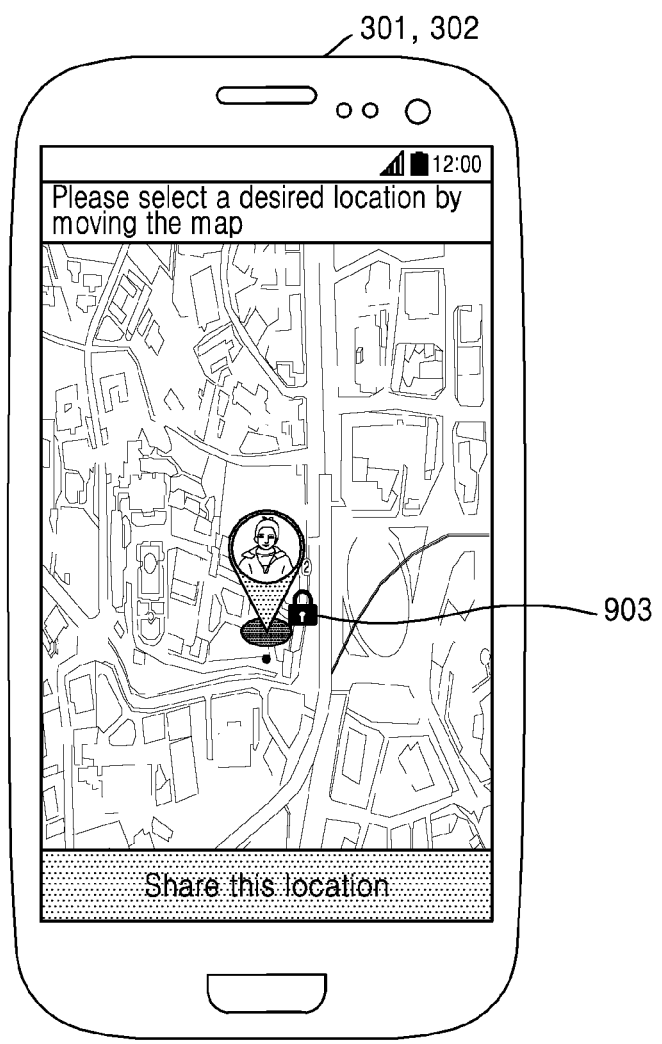

FIGS. 9A and 9B illustrate screens displaying a location setting function provided to a user terminal by a location sharing service apparatus according to one or more embodiments. As illustrated in FIG. 9A, the location sharing service apparatus 100 may display a detected location 901 found by the location sensing unit 110 of the user terminal and further display a menu 902 for setting a location of the user. The location sharing service apparatus 100 may also display address information corresponding to the detected location 901 found as the location of the user. As illustrated in FIG. 9B, when the user set a set location as the location of the user, a setting icon 903 may be displayed with the location of the user. The setting icon 903 is displayed to a user who set the location and may not be displayed to the other users in a chat room.

Figure 10:
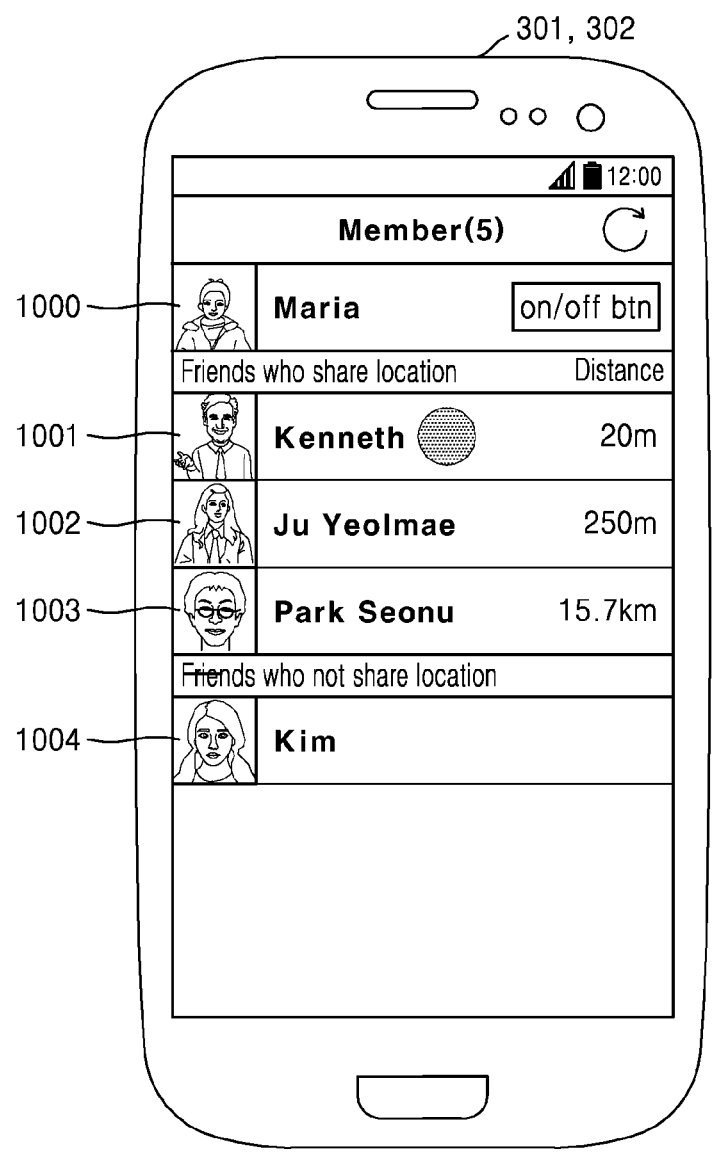

FIG. 10 illustrates a screen related to a location list provided to a user terminal by the location sharing service apparatus 100 according to one or more embodiments. In particular, the screen illustrated in FIG. 10 is a screen provided to Maria 1000 included in a chat room. As illustrated in FIG. 10, the location sharing service apparatus 100 may provide a screen including locations of other users in the chat room, Kenneth 1001, Ju Yeolmae 1002, and Park Seonu 1003 and distances between Maria 1000 and each of them to Maria 1000. As described above, the location sharing service apparatus 100 is not capable of providing a distance between Maria 1000 and Kim 1004, who does not agree on a location sharing.

Figure 11:
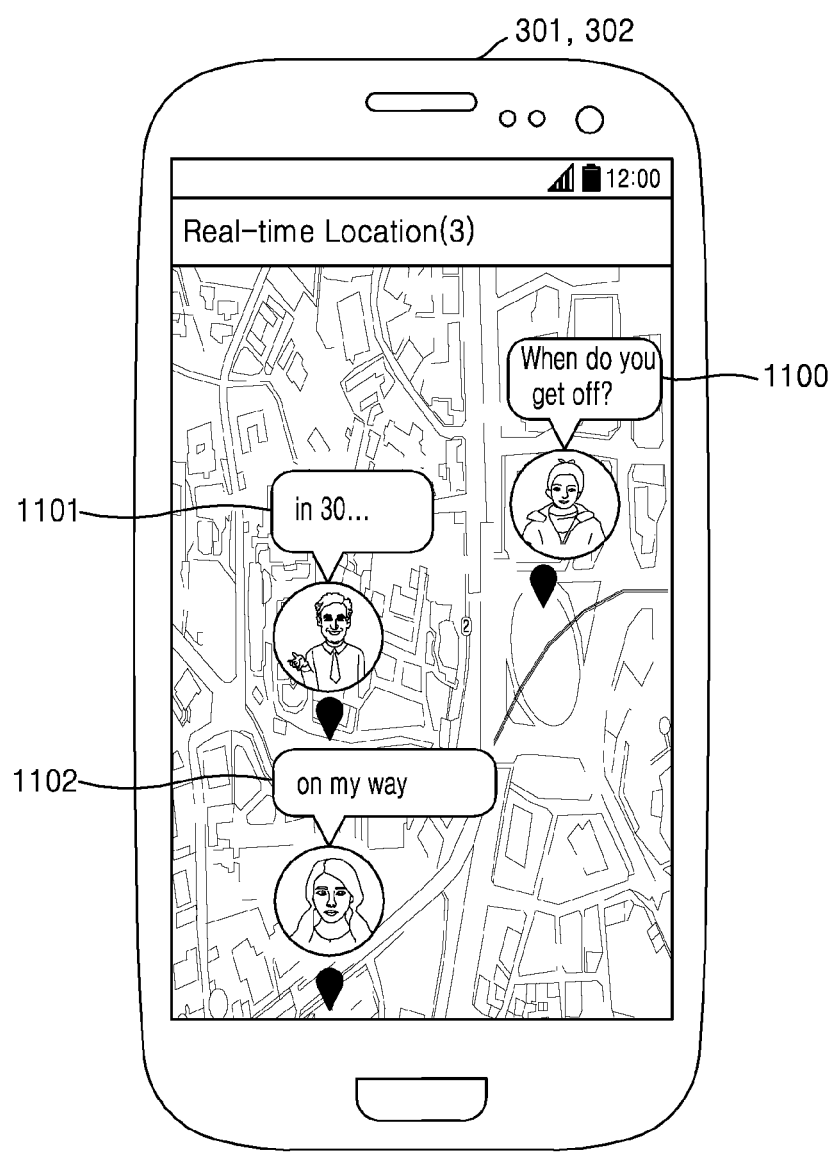

FIG. 11 illustrates a screen provided to a user terminal by the location sharing service apparatus 100 according to one or more embodiments. As illustrated in FIG. 11, a message 1100 a user input, 'When do you get off?', may be displayed together with map data. A reply 1101 to the message 1100, 'in 30', which a first friend input and a message 1102, 'on my way', which a second friend input may also be displayed together the map data.

As described above, according to one or more example embodiments of the inventive concepts, provided is a function for sharing current locations of a plurality of users.

Also, according to one or more example embodiments of the inventive concepts, provided is a function in which a location of each of a plurality of users is set as a specific location designated by each user and then the location set by the each user is shared therebetween.

In addition, according to one or more example embodiments of the inventive concepts, provided is a function for sharing a predetermined or, alternatively, desired target location with a plurality of users by a predetermined or, alternatively, desired time.

In addition, according to one or more example embodiments of the inventive concepts, provided is a function for sharing a predetermined or, alternatively, desired interest location with a plurality of users.

One or more example embodiments of the inventive concepts may implemented by one or more processors executing code (e.g., program code) storing instructions corresponding to the operations and/or functions described herein as being performed by, or in connection with, one or more example embodiments of the inventive concepts. The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), a digital signal processor (DSP), a system on chip (SoCs), and a field programmable gate array (FPGA).

The instructions may be recorded in a computer-readable recording medium. Examples of the computer-readable recording medium include magnetic media including hard disks, magnetic tapes, and floppy disks, optical media including CD-ROMs and DVDs, magneto-optical media including floptical disks, and hardware designed to store and execute the programmed commands in ROM, RAM, a flash memory, and the like. In addition, the computer-readable recording medium may include intangible media embodied in a form capable of being transmitted through a network, for example, in the form of software or an application that may be transmitted and distributed through a network.

Examples of the programmed commands include not only machine code generated by a compiler but also include a high-level programming language to be executed in a computer by using an interpreter.

The particular implementations shown and described herein are illustrative of at least some example embodiments of the inventive concepts and are not intended to otherwise limit the scope of example embodiments of the inventive concepts in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential to the practice of example embodiments of the inventive concepts unless the element is specifically described as "essential" or "critical".

The use of the terms "a", "an", and "the" and similar terms in the context of describing example embodiments of the inventive concepts (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or example language (e.g., "such as") provided herein, is intended merely to better illuminate at least some example embodiments of the inventive concepts and does not pose a limitation on the scope of example embodiments of the inventive concepts unless otherwise claimed. Numerous modifications and adaptations will be readily apparent to those of ordinary skill in this art without departing from the spirit and scope of example embodiments of the inventive concepts.

It should be understood that example embodiments described herein should be considered in a descriptive sense only and not for purposes of limitation. Descriptions of features or aspects within each example should typically be considered as available for other similar features or aspects in other example embodiments.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A location sharing service apparatus comprising:
    a memory having computer-readable instructions stored therein; and
    at least one processor configured to execute the computer-readable instructions such that the at least one processor is configured to,
        receive a location sharing request and a location setting request, the location sharing request indicating one or more friend terminals, the location setting request including a set location,
        detect a location of a user terminal in response to the location sharing request,
        periodically receive a second location in response to the location sharing request, the second location being a location of at least one of the one or more friend terminals,
        selectively designate the detected location as a first location,
        selectively designate the set location as the first location,
        share, as a current location of the user terminal, the first location with the one or more friend terminals,
        generate map data including the first location and the second location, and
        display the map data.

2. The location sharing service apparatus of claim 1, wherein the at least one processor is further configured to execute the computer-readable instructions such that the at least one processor is configured to calculate a first distance between the first location and the second location, and display the first distance.

3. The location sharing service apparatus of claim 1, wherein,
    the at least one processor is further configured to execute the computer-readable instructions such that the at least one processor is configured such that,
        the location sharing request includes a sharing time for which a location is shared, and
        the at least one processor performs the periodic receipt of the second location and the detection of a location of the user terminal until the sharing time expires.

4. The location sharing service apparatus of claim 1, wherein the at least one processor is further configured to execute the computer-readable instructions such that the at least one processor is configured to,
  determine whether a second distance between the detected location and the set location is equal to or greater than a distance threshold value, and
  output an alarm when the second distance is equal to or greater than a distance threshold value.

5. The location sharing service apparatus of claim 1, wherein the at least one processor is further configured to execute the computer-readable instructions such that the at least one processor is configured to,
  receive an input for sharing a target location,
  generate the map data so that the target location is included in the map data,
  calculate a third distance between the target location and the first location or the second location, and
  generate display data including the map data and the third distance.

6. The location sharing service apparatus of claim 1, wherein the at least one processor is further configured to execute the computer-readable instructions such that the at least one processor is configured to receive an interest location sharing request indicating an interest location, and generate the map data to include, in the map data, the interest location.

7. The location sharing service apparatus of claim 1, wherein the at least one processor is further configured to execute the computer-readable instructions such that the at least one processor is configured to,
  receive a first message,
  transmit the first message to the one or more friend terminals,
  receive a second message from the one or more friend terminals, and generate display data including the map data, the first message, and the second message.

8. The location sharing service apparatus of claim 1, wherein the at least one processor is further configured to execute the computer-readable instructions such that the at least one processor is configured to share, as the current location of the user terminal, the set location with the one or more friend terminals.

9. A method of providing a location sharing service, the method comprising:
  receiving a location sharing request indicating one or more friend terminals;
  receiving a location setting request including a set location;
  detecting, by one or more processors, a location of a user terminal, in response to the location sharing request;
  periodically receiving a second location, the second location being a location of at least one of the one or more friend terminals;
  selectively designating, by the one or more processors, the detected location as a first location of the user terminal;
  selectively designating the set location as the first location;
  sharing, as a current location of the user terminal, the first location with the one or more friend terminals;
  generating, by the one or more processors, the second location and map data including the second location; and
  displaying the map data.

10. The method of claim 9, further comprising:
  calculating, by the one or more processors, a first distance between the first location and the second location,
  wherein the map data includes the first distance.

11. The method of claim 9, further comprising:
  ending, by the one or more processors, the detection of a location of the user terminal and the periodic receiving of the second location when a time period expires,
  wherein the location sharing request includes the time period for which a location is shared.

12. The method of claim 9, further comprising:
  calculating, by the one or more processors, a second distance between the detected location and the set location,
  wherein the map data includes the second distance.

13. The method of claim 9, further comprising:
  receiving a target location sharing request including a target location;
  calculating, by the one or more processors, a third distance between the target location and the first location or the second location, in response to the target location sharing request,
  wherein the map data includes the third distance.

14. The method of claim 9, wherein, in response to an interest location sharing request input, the generating the map data includes generating the map data to include an interest location included in the interest location sharing request.

15. The method of claim 9, further comprising:
  transmitting, by the one or more processors, a first message to the one or more friend terminals, and receiving a second message from the one or more friend terminals; and
  generating, by the one or more processors, display data including the map data, the first message, and the second message.

16. The method of claim 9, wherein the sharing includes sharing, as the current location of the user terminal, the set location with the one or more friend terminals.

17. A non-transitory computer-readable recording medium storing instructions that, when executed by a processor, cause the processor to,
  receive a location sharing request indicating one or more friend terminals;
  receive a location setting request including a set location;
  detect a location of a user terminal, in response to the location sharing request;
  periodically receive a second location, the second location being a location of at least one of one or more friend terminals;
  selectively designate the detected location as a first location of the user terminal;
  selectively designate the set location as the first location;
  share, as a current location of the user terminal, the first location with the one or more friend terminals;
  generate the second location and map data including the second location; and
  display the map data.

18. The non-transitory computer-readable recording medium of claim 17, wherein the instructions, when executed by the processor, further cause the processor to share, as the current location of the user terminal, the set location with the one or more friend terminals.

* * * * *